United States Patent [19]
DeRome

[11] Patent Number: 4,782,689
[45] Date of Patent: Nov. 8, 1988

[54] APPARATUS AND METHOD FOR TESTING, FILLING AND PURGING CLOSED FLUID SYSTEMS

[76] Inventor: Raymond D. DeRome, 10401-336th Ave., Twin Lakes, Wis. 53181

[21] Appl. No.: 57,313

[22] Filed: Jun. 4, 1987

[51] Int. Cl.⁴ ............................................. G01M 3/26
[52] U.S. Cl. ...................................................... 73/49.2
[58] Field of Search .................. 73/40, 49.2, 37, 49.7, 73/45.8

[56] References Cited

U.S. PATENT DOCUMENTS

| | | | |
|---|---|---|---|
| 2,679,747 | 6/1954 | Andrus | 73/40 |
| 3,122,668 | 2/1964 | Cuny | 73/40 |
| 3,800,586 | 4/1974 | Delatorre et al. | 73/49.2 |
| 4,617,824 | 10/1986 | Gybulski et al. | 73/49.7 |
| 4,683,745 | 8/1987 | Broughman, Jr. et al. | 73/49.2 |

FOREIGN PATENT DOCUMENTS

| | | | |
|---|---|---|---|
| 21241998 | 7/1972 | Fed. Rep. of Germany | 73/49.2 |
| 493688 | 11/1985 | U.S.S.R. | 73/49.2 |

Primary Examiner—Stewart J. Levy
Assistant Examiner—Hezron E. Williams
Attorney, Agent, or Firm—Andrus, Sceales, Starke & Sawall

[57] ABSTRACT

An evacuation unit for testing the fluid tightness of a closed fluid system, filling the system with system fluid, and/or purging the system fluid of entrained gas. The evacuation unit includes a source of system fluid, an air operated venturi vacuum pump, a hose for releasable and sealable connection to an access port of the closed fluid system, and a three way valve for selected positioning between a first position communicating the vacuum pump with the flexible hose system to produce a vacuum in the system, a second position isolating the flexible hose and system to test for fluid tightness, and a third position communicating the system fluid source with the flexible hose and system for filling the system through the access port with system fluid. A method of purging entrained gas from a closed fluid system as well as a method of testing the fluid tightness of the system and filling the system with system fluid without disconnecting the evacuation unit is also disclosed.

5 Claims, 2 Drawing Sheets

continued

| U.S. Pat. No. | Inventor | Issue Date |
| --- | --- | --- |
| 4,235,100 | Branchini | Nov. 25, 1980 |
| 4,458,523 | Moyer | July 10, 1984 |
| 4,494,402 | Carney | Jan. 22, 1985 |
| 4,574,620 | Cohl | March 11, 1986 |

APPARATUS AND METHOD FOR TESTING, FILLING AND PURGING CLOSED FLUID SYSTEMS

BACKGROUND OF THE INVENTION

The present invention relates to testing closed fluid systems, and more particularly to an apparatus and method for testing, filling and purging entrained gas from closed fluid systems such as engine coolant systems.

Pressure testing the fluid tightness of closed fluid systems is primarily used in connection with automotive systems such as engine cooling systems, hydraulic brake systems, hydraulic clutch systems, hydraulic power steering systems, and air conditioning coolant systems. For example, most automotive internal combustion engines utilize a liquid cooling system comprising water and additives such as propylene glycol to maintain the engine within an optimum temperature range for operating efficiency. Such cooling systems generally employ a water pump which serves to circulate liquid coolant through flow paths located within the engine block where heat is transferred from the operating engine to the coolant, and then through a radiator where heat transfer occurs between the liquid and the atmosphere. With the advent of smaller engines having relatively high horsepower, more intricate cooling passages are necessary within the engine block. Additionally, the use of smaller radiators due to considerations of cost and sizing limitations, and higher operating temperatures for the engines results in a considerable amount of heat developed by the engine which must be dissipated through a relatively small radiator surface area. As a consequence, it is more important than ever to eliminate air pockets in the system as well as entrained air in the coolant so as to avoid "hot spots" from developing in the engine.

Since the cooling system of an automobile is designed to be a closed system, any minor leaks present in the flow path will reduce the efficiency of the system and may result in excessive coolant loss. As coolant is lost through leaks, the capability of the system to keep the engine temperature within an optimum range for operating efficiency is decreased, and if enough coolant is lost, overheating occurs with resultant damage to the engine. It is thus desirable that the cooling systems of internal combustion engines should be tested periodically on a regular basis in order to access the integrity of the system by detecting the presence of leaks, and filling the coolant system with fresh liquid coolant. Additionally, it is desirable to accomplish this testing and filling operation without creating air pockets in the system and without entraining a significant amount of air in the system fluid. This latter requirement is particularly advantageous with respect to the hydraulic fluid systems noted above relating to brake, clutch, and steering systems.

Various devices are known that are designed to test the fluid tightness of engine coolant systems, some examples are disclosed in the following U.S. patents:

| U.S. Pat. No. | Inventor | Issue Date |
| --- | --- | --- |
| 3,207,254 | D'Espinassy De Venel | Sept. 21, 1965 |
| 3,623,372 | Markey | Nov. 30, 1971 |
| 3,650,147 | Moyer | Mar. 21, 1972 |
| 4,114,425 | Hicks | Sept. 19, 1978 |

SUMMARY OF THE INVENTION

An evacuation unit for testing the fluid tightness of a closed fluid system having an access port and for filling the system with a system fluid through the access port without disconnecting the evacuation unit. The evacuation unit may also be employed to purge substantially all entrained air from a closed fluid system.

The evacuation unit includes a source of system fluid, vacuum pump means for producing a vacuum of a predetermined pressure less than atmospheric pressure, connection means for releasable and sealable connection to the access port of the closed fluid system, and valve means for selective positioning between a first position communicating the vacuum pump means with the connection means to produce a vacuum in the system, a second position isolating the connection means and system to test for fluid tightness, and a third position communicating the system fluid source with the connection means for filling the system with system fluid.

In one aspect of the invention, the vacuum pump means includes a source of fluid under pressure, a venturi, and conduit means interconnecting the pressurized fluid source and the venturi. The pressurized fluid is preferably air. The connection means preferably includes a flexible hose having a filler head on one end for attachment to the access port of the system and coupling means on its other end for attachment to the valve means.

In another aspect of the invention, the evacuation unit also includes a separation tank disposed between the vacuum pump means and the valve means so that system fluid drawn therein under vacuum separates into a liquid phase and a gas phase. This removes entrained gas, particularly air, from the system fluid when the valve means is in its first position. Thus, substantially all entrained air may be removed or purged from a closed fluid system such as an automotive coolant system, brake system, clutch system, power steering system, or air conditioning coolant system.

In still another aspect of the invention, a method of testing the fluid tightness of a closed fluid system having an access port includes the steps of draining the fluid system of the fluid therein, releasably and sealingly connecting an evacuation unit to the access port of the fluid system, actuating the evacuation unit to produce a vacuum in the system to a predetermined pressure less than atmospheric pressure, discontinuing application of the vacuum on the system, and observing any pressure increase that may occur. Preferably, the step of actuating the evacuation unit comprises applying a source of fluid under pressure, such as air, to the evacuation unit and passing the fluid through a venturi.

In still a further aspect of the invention, the system may be refilled with system fluid through the access port without disconnecting the evacuation unit. Refilling the system may be accomplished simply by connecting the evacuated system to a source of system fluid which is at atmospheric pressure. The differences in pressure thus force system fluid into the evacuated system. Additionally, in order to aid in refilling the system and to remove entrained air from the system fluid, the system may be disconnected during the initial filling from the source of system fluid and thereafter the evacuation unit may be reactuated to produce a vacuum on the system at a time prior to the system being completely filled with system fluid. Thereafter, reapplication of vacuum on the system is discontinued and then the evacuated system is reconnected to the source of system fluid to fill the remainder of the system with system fluid.

Purging of substantially all entrained gases such as air from a closed fluid system may be accomplished by releasably and sealingly connecting the evacuation unit to the access port of the system, actuating the evacuation unit to produce a vacuum on the system to a predetermined pressure less than atmospheric pressure which results in drawing fluid from the system, and separating the fluid drawn from the system from air entrained therein. The step of separation preferably comprises passing the hydraulic fluid drawn from the system through a separation tank at a location upstream from the evacuation unit to produce a liquid fluid phase and a gaseous air phase. Simultaneously, the fluid may be replenished to the system as the fluid is withdrawn from the access port by the evacuation unit.

Other features and advantages of the invention will become apparent to those skilled in the art upon reviewing the following detailed description, the drawings, and the appended claims.

BRIEF DESCRIPTION OF THE DRAWINGS

The drawings illustrate the best mode presently contemplated of carrying out the invention.

In the drawings.

DESCRIPTION OF THE PREFERRED EMBODIMENT

Figure 1:
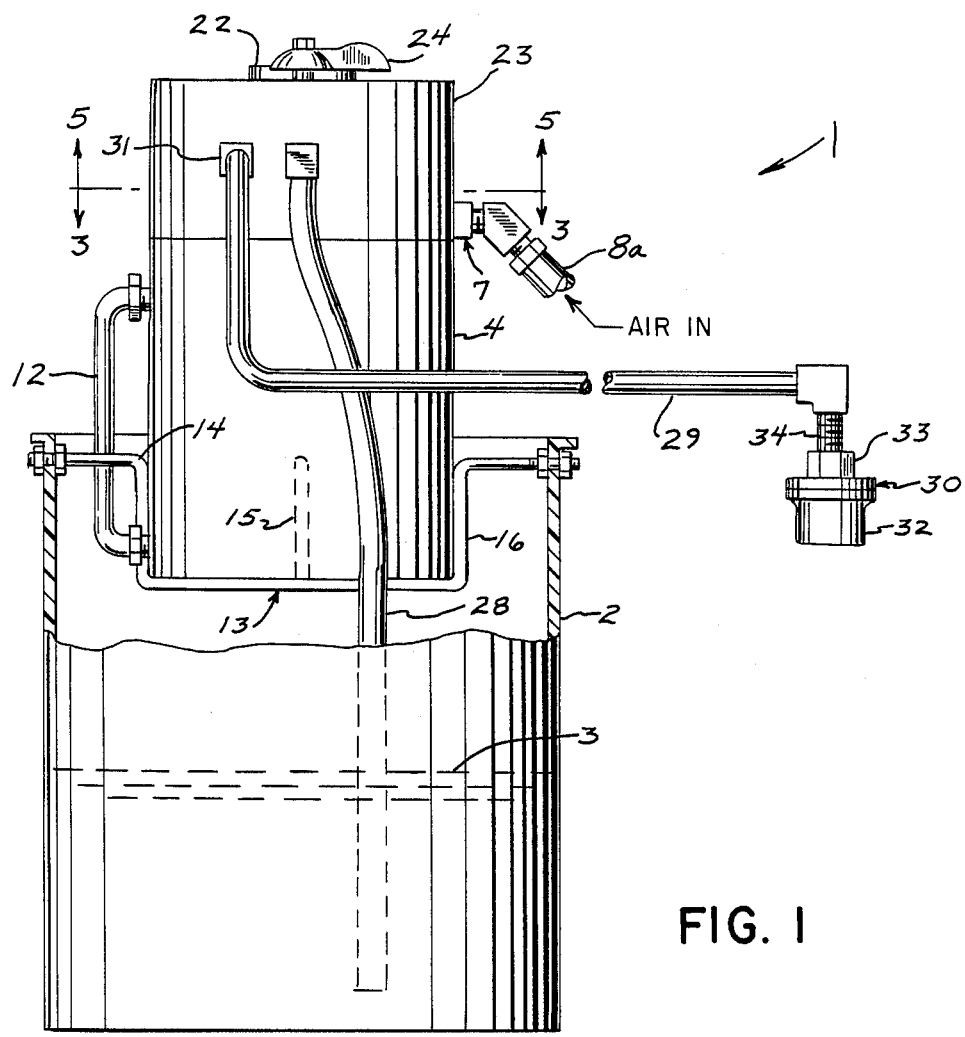
FIG. 1 is a side view in elevation with parts broken away illustrating an evacuation unit constructed in accordance with the principles of the present invention.

Referring now to the drawings, there is illustrated an evacuation unit, generally designated by the numeral 1, for testing the fluid tightness of a closed fluid system, for filling the system with system fluid, and for purging the system of entrained gas such as air. The evacuation unit has its primary use in connection with automobile engine cooling systems and although unit 1 is illustrated, and will be described, in that environment, it will be apparent to those skilled in the art that unit 1 and the method disclosed herein may find suitable uses in other environments where it is desired to observe the pressure integrity of closed systems. In particular, the purging of entrained air from closed systems finds its primary use in connection with automobile closed hydraulic fluid systems such as brake, clutch, power steering, and air conditioning systems.

Figure 2:
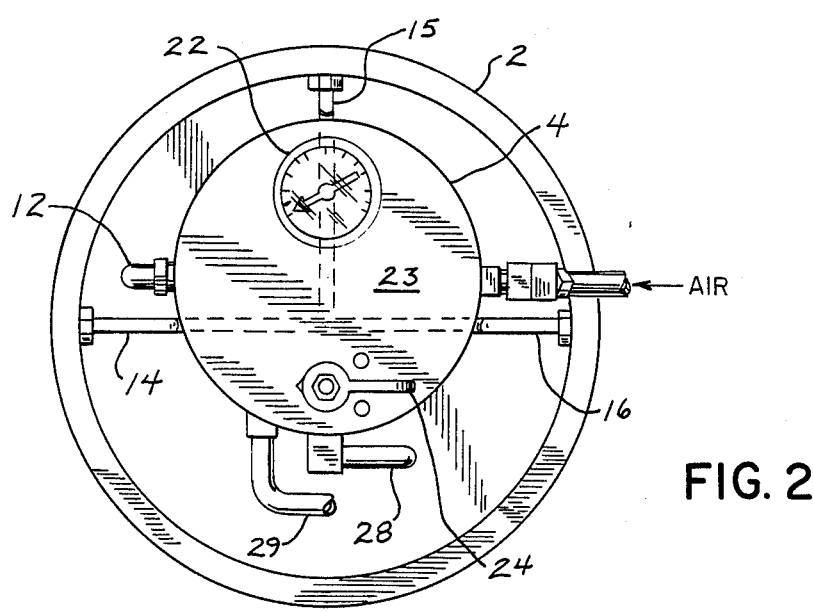
FIG. 2 is a top plan view of the evacuation unit of FIG. 1.

Referring now to FIGS. 1 and 2, evacuation unit 1 includes a reservoir or source 2 of system fluid 3. In particular, system fluid 3 may comprise an automotive cooling system fluid which typically is composed of a mixture of water and propylene glycol. Reservoir 2 is a conventional open top container composed of any noncorrosive material such as a plastic material. Typically, reservoir 2 has a height sufficient to contain a sufficient amount of fluid 3 at its bottom to fill the coolant system of an automobile, and yet, as will be described hereinafter, maintain a separation tank 4 therein at a sufficient height to prevent fluid 3 from coming in contact therewith. Additionally, as shown best in FIG. 2, reservoir 2 has a diameter greater than that of tank 4.

Tank 4 is an enclosed container preferably made of a non-corrosive material such as a plastic material. As shown best in FIG. 3, top 5 of tank 4 is recessed from the upper edge of tank 4 to form an annular flange 6 at the top of tank 4. Flange 6 includes an opening therein for receiving an air operated vacuum pump in the form of a venturi 7. Venturi 7 is of the conventional type having an inlet 8 and an outlet 9. Venturi 7 and includes a short flared end connected to outlet 9 and a long flared and connected to inlet 8 with a constricted middle therebetween. Inlet 8 may be connected via a flexible hose 8a to a source of pressurized air, which is commonly found in shop areas of automotive repair shops, filling stations and the like to produce a suction or vacuum at its constricted middle, as is conventional. Preferably, venturi 7 should be constructed so as to permit a vacuum of between about 25 to about 27 inches of mercury. As shown best in FIG. 4, the constricted middle of venturi 7 is connected via mating ports 10, 11 in venturi 7 and top 5 respectively, to tank 4. Thus, as air passes through venturi 7 venturi 7 produces a vacuum inside of tank 4.

As shown best in FIG. 1, tank 4 also includes a sight tube or hose 12 made of a transparent material. Sight tube 12 enables an operator to visually determine the level of fluid or liquid contained within tank 4. Sight tube 12 is connected at one end near the top of tank 4 and at its other end near the bottom of tank 4. Thus, if one desires to drain tank 4 into reservoir 2, sight tube 12 is disconnected at its lower end thus permitting the fluid within tank 4 to drain by gravity into reservoir 2.

As seen best in FIGS. 1 and 2, tank 4 is mounted within reservoir 2 by means of a support bracket 13. Support bracket 13 includes three offset or bent legs 14-16 each of which has one end connected to reservoir 2 and its other end connected to the ends of the remaining legs to form a common joint for supporting tank 4 within reservoir 2. Thus, legs 14-16 form a recessed area that receives and supports tank 4, and as best shown in FIG. 2, supports tank 4 in an eccentric location within reservoir 2.

Figure 3:
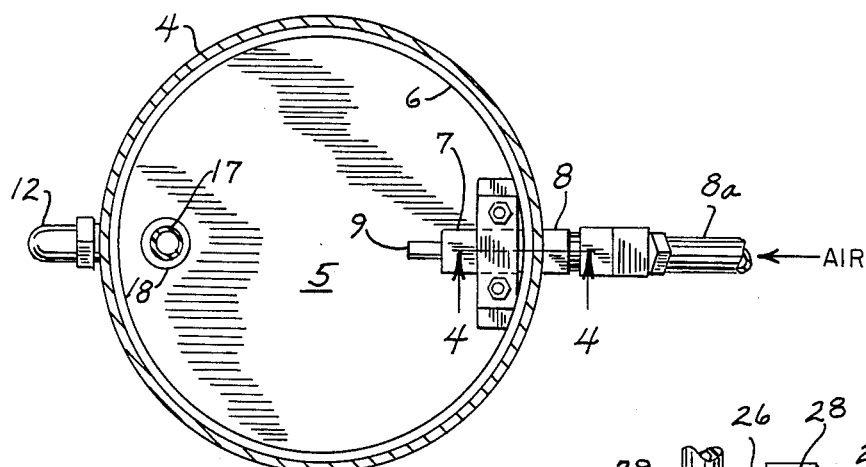
FIG. 3 is a cross sectional view taken along the plane of the line 3—3 in FIG. 1.
Figure 4:
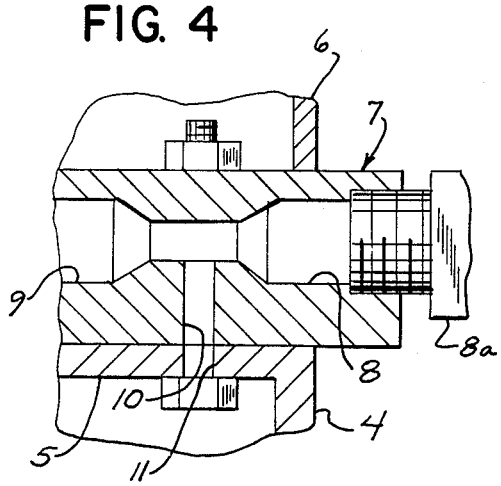
FIG. 4 is a cross sectional view taken along the plane of the line 4—4 in FIG. 3.
Figure 5:
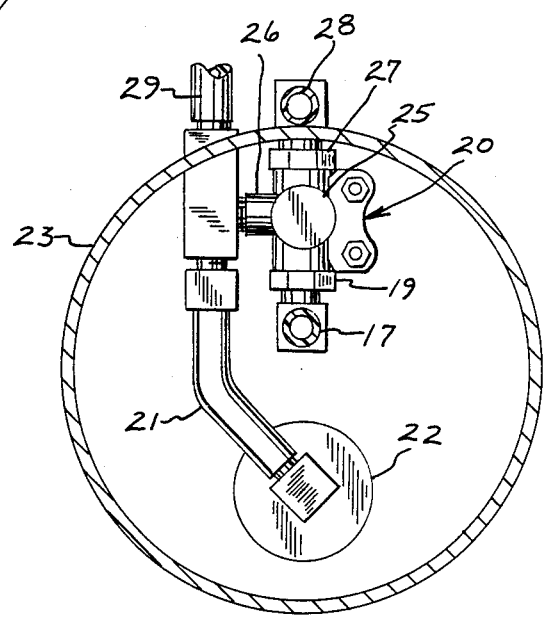
FIG. 5 is a cross sectional view taken along the plane of the line 5—5 in FIG. 1.
Figure 6:
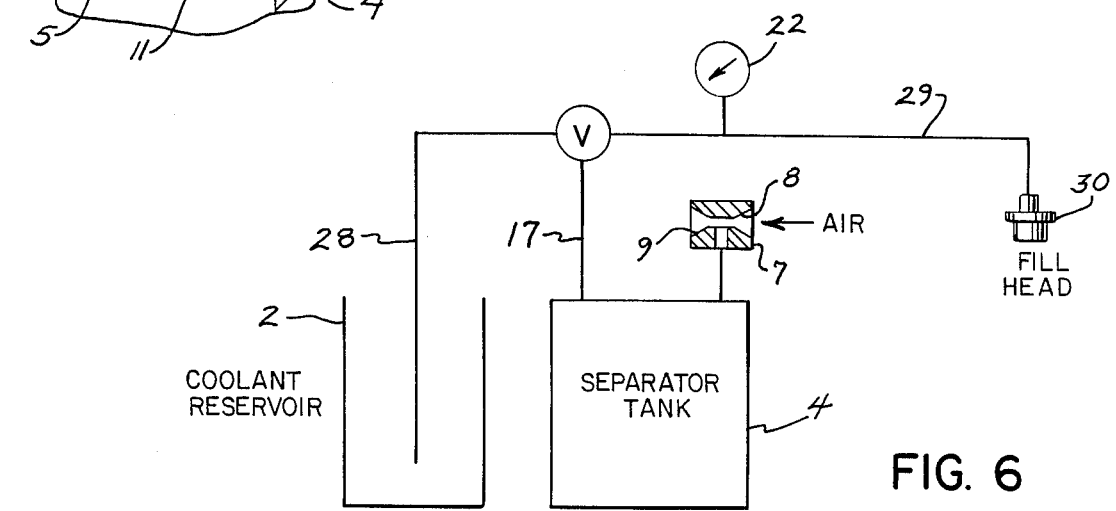
FIG. 6 is a schematic diagram illustrating the circuitry of the evacuation unit of FIG. 1.

As shown best in FIG. 3, top 5 of tank 4 also includes an opening therein located opposite of venturi which houses a flexible hose 17 in fluid tight relationship by means of seal 18. As shown in FIG. 5, the opposite end of hose 17 is connected to one port 19 of a three way valve 20. Port 19 of valve 20 as well as hose 17 is also connected via hose 21 to a vacuum gauge 22 housed in tank cover 23. Gauge 22 thus provides a measure of the vacuum within unit 1 at any given point in time.

As shown best in FIGS. 2 and 5, control valve 20 is housed in tank cover 23 opposite gauge 22 and includes an operating lever 24 on the outside of cover 23 which manually controls the position of a spool within valve body 25 with respect to ports 19, 26 and 27. Port 27 is connected via a flexible transparent hose 28 to fluid 3 within reservoir 2 while port 26 is connected via a transparent hose 29 to an access port of the closed fluid system, typically the radiator cap opening of an automotive coolant system. As shown best in FIG. 1, one end of hose 29 includes a filler head 30 for attachment to the access port of the fluid system, while the other end of hose 29 is connected to outlet port 26 by means of a coupling 31. Coupling 31 may be of the "quick disconnect" type to facilitate use of dedicated service hoses typically found in automobile repair and service shop locations. Filler head 30 is of the type that may be releasably and sealingly connected to the access port of a closed fluid system, and as shown best in FIG. 1 may be of the type which includes a resilient rubber membrane 32 which is flexed outwardly as a nut 33 is turned down upon a threaded shaft 34 so that membrane 32 sealingly engages the access port.

In operation, and assuming it is first desired to purge substantially all entrained air from a close hydraulic fluid system such as the hydraulic brake system of an automobile, hose 29 is connected to port 26 and filler head 30 is replaced by another standard coupling which is connected to an access port of the hydraulic system. Preferably, the access port would be at or adjacent the brake pads and wheels. Next, a source of air under pressure is attached via hose 8a to inlet 8 of venturi 7, and valve 20 is positioned substantially as shown in FIG. 2 to interconnect ports 26 and 19. The air under pressure is then permitted to pass through venturi 7 to create a suction or vacuum within tank 4, hose 17, port 19, port 26 and hose 29 so that hydraulic fluid is drawn from the fluid system into hose 29 through ports 26 and 19, and then into tank 4 via hose 17. Once in tank 4, the hydraulic fluid with entrained air therein is separated to produce a liquid hydraulic fluid phase and a gaseous air phase. Simultaneously as the hydraulic fluid is withdrawn from the fluid system fresh hydraulic fluid may be replenished into the system via the master truck. The evacuation is continued until an operator determines that substantially all bubbles or entrained air is removed from the hydraulic fluid. This is accomplished by observing in transparent hose 29 when the fluid no longer contains entrained air bubbles. At this point in time, the pressurized air is turned off, and hose 29 is disconnected from the fluid system.

If one desires to test the fluid tightness of a closed fluid system, such as an automotive engine coolant system, and to refill the system with fresh fluid, one first drains the fluid system of the fluid or coolant therein and then connects one end of hose 29 to port 26 of valve 20 and sealingly connects filler head 30 within the radiator cap opening. Air under pressure is then connected to venturi 7 and valve 20 is positioned substantially as shown in FIG. 2. The air under pressure is then passed through venturi 7 to create a suction or vacuum within the fluid coolant system, substantially as described above. When gauge 22 indicates that a vacuum of about 25 to about 27 inches of mercury has been created within the fluid system, valve lever 24 is moved to a test position. As shown best in FIG. 2, lever 24 is rotated in a counterclockwise direction 90° with respect to the position shown in solid lines so that hose 29 and the fluid system are isolated from the remainder of the vacuum unit to test for fluid tightness. Thus, after discontinuing application of the vacuum on the system an operator observes whether there is any pressure increase in the system by observing the needle of gauge 22. If the needle drops, this indicates a leak in the system.

If on the other hand no leaks are determined to be in the system, the system may be refilled through the radiator cap opening without disconnecting the evacuation unit or hose 29. In order to accomplish this, valve or lever 24 is rotated in a clockwise direction 90° from the position shown in FIG. 2 so that port 26 is now connected and communicates with port 27. Port 27 in turn communicates via hose 28 with fresh coolant system fluid 3 in reservoir 2. Since fluid 3 is at atmospheric pressure, fluid 3 is forced through hose 28, ports 27 and 26, and then through hose 29 and into the coolant system. As refilling occurs, gauge 22 will indicate that vacuum within the fluid system is reducing i.e. the pressure is increasing within the system. When the vacuum falls to about 15 inches of mercury, valve lever 24 is once again moved to the position shown in solid lines in FIG. 2 to once again produce a vacuum on the system to a predetermined vacuum of about 25 to about 27 inches of mercury. This typically occurs when the system is approximately half filled with fresh system fluid. As vacuum is once again applied to the system, entrained air is removed from the coolant in the manner previously described above so that substantially all entrained air is removed from the fresh coolant being used to fill the system. Finally, valve lever 24 is once again moved to its fill position to communicate ports 26 and 27 so that atmospheric pressure once again forces the coolant into the system, as previously described, until the system is substantially full of coolant. At this point in time, the vacuum within the system falls to approximately 1 inch of mercury.

Various modes of carrying out the invention are contemplated as being within the scope of the following claims particularly pointing out and distinctly claiming the subject matter which is regarded as the invention.

I claim:

1. A method of testing the fluid tightness of a closed fluid system having an access port, comprising the steps of:

draining the fluid system of the fluid therein;
   releasably and sealingly connecting a evacuation unit to the access port of the fluid system;
   actuating the evacuation unit to produce a vacuum on the system to a predetermined pressure less than atmospheric pressure;
   discontinuing application of the vacuum on the system;
   observing any pressure increase that may occur;
   re-filling the system with system fluid after observing any pressure increase that may have occurred through the access port without disconnecting the evacuation unit, said step of re-filling comprises connecting the evacuated system to a source of system fluid which is at atmospheric pressure;
   disconnecting the system from the source of system fluid; and thereafter
   re-actuating the evacuation unit to produce a vacuum on the system to a predetermined pressure less than atmospheric pressure at a time prior to the system being completely filled with system fluid.

2. The method of claim 1 wherein the step of actuating the evacuation unit comprises applying a source of fluid under pressure to the evacuation unit, and passing the fluid through a venturi.

3. The method of claim 2 wherein the fluid is air.

4. The method of claim 1 further including the steps of discontinuing re-application of the vacuum on the system, and thereafter re-connecting the evacuated system to the source of system fluid to fill the system with system fluid.

5. An evacuation unit for testing the fluid tightness of a closed fluid system having an access port and for filling the system with system fluid through said access port, comprising:

a source of system fluid;

vacuum pump means for producing a vacuum of a predetermined pressure less than atmospheric pressure, said vacuum pump means includes a source of air under pressure, a venturi, and conduit means interconnecting said pressurized air source and said venturi;

connection means for releasable and sealable connection to an access port of a closed fluid system, said connection means includes a flexible hose having opposite ends, a filler head on one end of said hose for attachment to said access port, an coupling means on the other end of said hose;

valve means disposed between said coupling means and said source of system fluid for selective positioning between a first position communicating said vacuum pump means with said connection means to produce a vacuum in the system, a second position isolating said connection means and system to test for fluid tightness, and a third position communicating said system fluid source with said connection means for filling the system with system fluid; and a separation tank disposed between said vacuum pump means and said valve means so that system fluid drawn therein separates into a liquid phase and a gas phase to remove entrained gas from said system fluid when said valve means is in said first position.

* * * * *